United States Patent [19]

Osborn

[11] Patent Number: 4,821,936
[45] Date of Patent: Apr. 18, 1989

[54] HYDRAULIC INDEX DRIVE SYSTEM
[75] Inventor: Paul V. Osborn, Webster, N.Y.
[73] Assignee: Mobil Oil Corporation, New York, N.Y.
[21] Appl. No.: 99,276
[22] Filed: Sep. 21, 1987
[51] Int. Cl.⁴ .................... B65H 20/10; F16H 27/04; F16H 39/04; F16H 39/46
[52] U.S. Cl. ..................... 226/170; 60/487; 60/489; 226/120; 226/139
[58] Field of Search .............. 226/120, 139, 152, 170; 60/487, 489

[56] References Cited
U.S. PATENT DOCUMENTS

| | | | |
|---|---|---|---|
| 2,907,230 | 10/1959 | Kollmann | 60/489 X |
| 3,355,166 | 11/1967 | Plumb | 226/170 X |
| 3,425,610 | 2/1969 | Stewart | 226/170 X |
| 3,643,434 | 2/1972 | Widmaier | 60/487 X |
| 3,680,312 | 8/1972 | Forster | 60/489 X |
| 4,188,859 | 2/1980 | Van Wagenen et al. | 60/487 X |
| 4,192,705 | 3/1980 | Wech . | |

Primary Examiner—John Petrakes
Attorney, Agent, or Firm—Alexander J. McKillop; Charles J. Speciale

[57] ABSTRACT

An hydraulic index drive system including a variable displacement pump closely coupled to a fixed displacement motor through an adaptor which feeds oil to and returns oil from the motor. A lever on the pump controls the position of a swash plate which determines the pump displacement. The lever is positioned by a cam which makes one revolution per cycle. The cam is designed such that for 40% of the cycle there is no pump output which is the dwell portion of the cycle and for 60% of the cycle the output rises to a set maximum and returns to zero output which is the index portion of the cycle. The pump is driven by a variable speed motor. The system is particularly suited for use with a vacuum conveyor on a bag machine line for transfer of plastic bags to a bag folder.

16 Claims, 7 Drawing Sheets

HYDRAULIC INDEX DRIVE SYSTEM

FIELD OF THE INVENTION

This invention relates to a high-speed, high torque hydraulic index drive for a roll and particularly to an hydraulic index drive coupled to a drive roll of a conveyor for intermittently moving web material through a machine line.

BACKGROUND OF THE INVENTION

In certain applications it is necessary to deliver a high torque as the rotational speed of a drive roll goes from zero to a maximum RPM and back to zero doing many cycles per minute. By way of example, in a system for the manufacture of plastic film bags such as garbage bags, trash bags, and the like, it is necessary to precisely position the plastic bags delivered from a bag machine to an exact position on a vacuum/air conveyor for transfer to a bag folder. Examples of such a bag making system are disclosed in my related applications Plastic Film Air Table Conveyor, Ser. No. 099,275 and Flexible Material Folding Apparatus Ser. No. 099,277 concurrently filed herewith and incorporated herein by reference thereto. In a bag making system of the type disclosed therein, the torque applied to the driven roll on the vacuum/air table is in the order of plus and minus 500 in. lbs. as the rotational speed goes from zero to 1200 RPM and back to zero 120 times per minute. Five hundred in. lbs. of torque must be generated to index the conveyor belts within the 300 milliseconds cycle time allocated for a 120 bag per minute production rate.

Various types of indexing drives have been used in the past for bag machines. One example is the crank, rack-pinion, clutch-brake system commonly used for bag machine indexing drives. The disadvantage in such drives is that the clutch brake is subject to wear and loses accuracy and it also has a high inertia. Also in such drives the index is limited to 50% of the cycle and thus are not suitable for the present application where more time is desired for indexing. Another example of an indexing roll drive system is disclosed in U.S. Pat. No. 4,192,705 which discloses a short dwell mechanical indexing drive system for intermittently moving a web of thermosealing material through a bag machine with the web advancing or indexing movement of each cycle being in excess of 180° of the cycle. One of the problems with mechanical index drives is that the speed at the torques required adds too much inertia to the system. Electric servo index systems have been used in bag machine lines; however, they require an increase in power to cover both motor inertia and vacuum table inertia.

The hydraulic index drive system of the present invention has numerous advantages. A small control force yields a large output torque. The system has both index length flexibility and cycle time flexibility. The drive can be coupled directly to the vacuum table drive shaft through a flexible coupling eliminating inertia for pulleys and belts or gears. The drive is inexpensive as a commercial pump and motor can be used. The rotor of the pump adds little inertia to the system. No clutch-brake is required. There is an overload release at maximum pressure and the system requires a relatively small motor drive.

The present invention incorporates an adaptor housing between the variable volume and the hydraulic motor having a fixed volume which is of unique design. The adaptor includes a special flushing arrangement to divert flow so as to purge air within the pump during setup. The adaptor is specially designed to pass oil between the motor and pump with minimum resistance and includes a relief valve. Of the approximately five horse power required to drive the hydraulic index drive system one horse power is converted into heat. The cooling in the present system is provided by a water cooled system for the adaptor. Since oil is compressible, the working volume of the system is kept at a minimum. Only approximately three cubic inches of oil are subjected to high pressure and the pump displacement needed is only about 1.29 cubic inches.

SUMMARY OF THE INVENTION

It is an object of the invention to provide a high-speed, high torque hydraulic index drive for the drive roll of a conveyor. The index drive is suited for intermittently moving web material such as plastic film bags on a conveyor to a folding apparatus. It is a further object of the invention to drive the drive roll of the conveyor during a predetermined cycle, each cycle including an index portion and a dwell portion.

These and other objects of the invention are accomplished by an hydraulic index drive system connected to the drive roll of the conveyor, the hydraulic index drive system comprising a variable displacement hydraulic pump having an adjustable swash plate, a fixed displacement hydraulic motor and an adaptor positioned between the motor and the pump coupling the pump to the hydraulic motor to feed hydraulic fluid to and return hydraulic fluid from the hydraulic motor. The pump is provided with a lever for controlling the position of the swash plate to determine pump displacement. A cam is operably connected to the lever for positioning the lever and means is provided for rotating the cam through one revolution per cycle, the cam being shaped to include a dwell portion and an index portion. In a preferred form of the invention, the dwell portion of the cam corresponds to about 40% of the cycle so that there is no pump output during the dwell portion of the cycle and the index portion of the cam corresponds to about 60% of the cycle so that the output of the pump rises to a set maximum during the index portion of the cycle, whereby the pressure supplied to the motor brings the conveyor up to maximum speed during the index portion and the pressure returned from the motor decelerates the speed of the conveyor to zero during the dwell portion. Means is also provided for driving the hydraulic pump at the same speed as the delivery of the web material to the conveyor.

In accordance with a further aspect of the invention cooling means is provided for cooling the temperature of the adaptor.

In accordance with another aspect of the invention the hydraulic index drive system includes a reservoir of hydraulic fluid connected with the adaptor for replacing any leakage of hydraulic fluid from the hydraulic pump and the hydraulic motor and to recycle the leakage back to the reservoir.

In accordance with a further aspect of the invention the hydraulic index drive system is provided with a feedback system for improving the index accuracy of the conveyor comprising valve means for bypassing the hydraulic motor during deceleration for allowing the motor and the conveyor to coast further than normal to compensate for higher than normal drag, and means for initiating a bypass pulse to operate the valve at a fixed point in the cycle and for terminating the pulse when the index has reached a predetermined distance through the index so that where the index is less than normal, the conveyor takes a longer time to reach the stop position resulting in a longer coast time for compensation. In accordance with another aspect of the invention means is provided for purging air from the hydraulic index drive system when the system is initially filled with hydraulic fluid by circulating flows of both pump and motor through the storage reservoir.

It is another aspect of the invention to provide means of setting the maximum pressure in the system which bypasses the motor and effectively disconnects the pump from the motor during overload to protect both the index system and the load being driven from damage.

These and other aspects of the invention will become apparent upon reference to the accompanying drawings and the following detailed description of the invention.

BRIEF DESCRIPTION OF THE DRAWINGS

This invention will be better understood through the subsequent detailed description and by reference to the accompanying figures, in which.

DETAILED DESCRIPTION OF THE INVENTION

The following invention can be incorporated into a draw tape bag line, for example, of the type described in U.S. Pat. No. 4,624,654 Boyd et al, assigned to the assignee to this application and incorporated by reference, or a comparable bag line.

Figure 1:
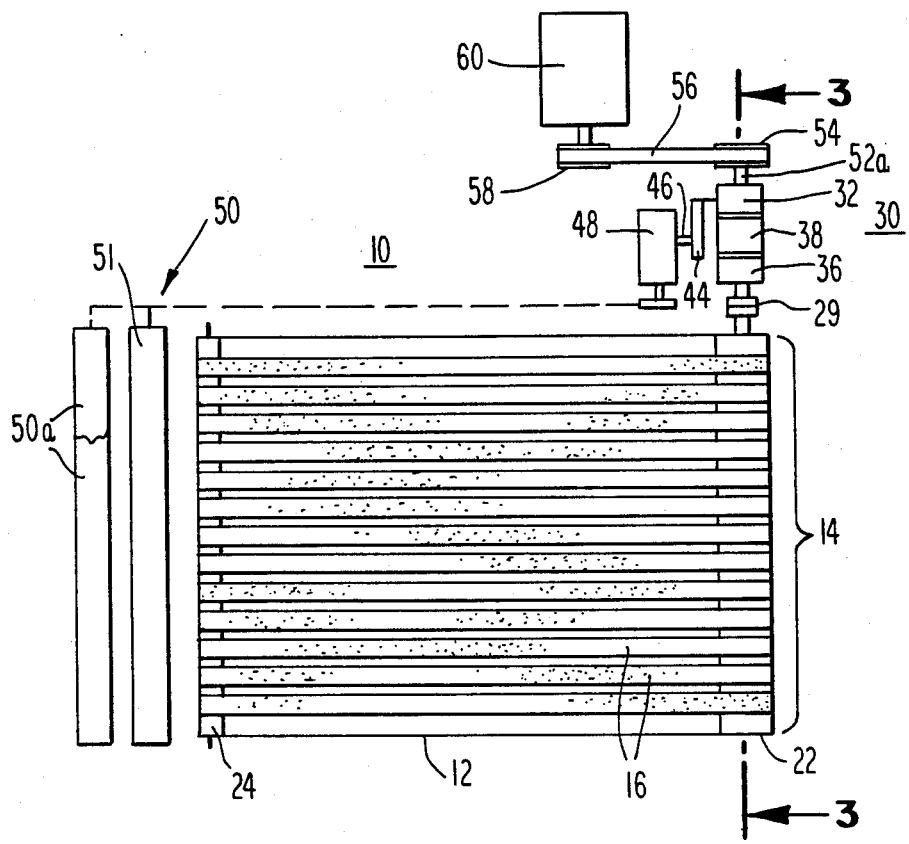
FIG. 1 is a diagrammatic plan view of a thermoplastic film handling apparatus incorporating an hydraulic index drive system embodying the present invention.
Figure 2:
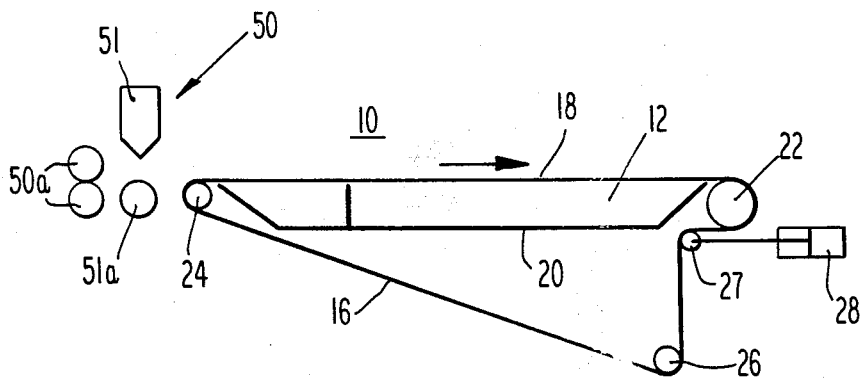
FIG. 2 is a front elevational view of FIG. 1.

Referring to FIGS. 1 and 2, there is illustrated a plastic film handling apparatus identified generally by the reference numeral 10. The apparatus 10 is used in connection with a conventional bag manufacturing machine such as an AMPLAS Model No. 1402, indicated diagrammatically at 50. The bag machine 50 includes a heated sealer/cutter bar 51 reciprocated against a roller anvil 51a. A pair of nip rolls 50a are operated in synchronization with the bar 51 to "index" or advance a bag width or bag length of continuous thermoplastic bag forming film between the sealer/cutter bar 51 and the roller anvil 51a. The major components of apparatus 10 include an air/vacuum table or box 12 and a conveyor for the bags indicated generally by a reference numeral 14 passing over the box 12 and formed by a plurality of parallel spaced endless belts 16. The belts 16 are guided around upper and lower horizontal sides 18 and 20 (i.e. top and bottom) of the box 12 on rolls or rollers 22, 24 and 26. A plurality of pivotally supported arms (not shown) each supports a pulley 27 which is pressed against an individual belt 16 by an air cylinder 28 for adjusting the tension of the belt 16. Further details of the apparatus 10 as thus far described are disclosed and claimed in the aforesaid copending applications Ser. No. 099,277 and Ser. No. 099,275. The drive roll 22 is coupled to a flexible coupling 29, which may be of any suitable type and preferably of the type disclosed in my related application Ser. No. 099,278. Flexible Coupling, concurrently filed herewith and incorporated herein by reference thereto, and with an hydraulic index drive system generally identified by the reference character 30 which forms the subject matter of the present application.

Figure 3:
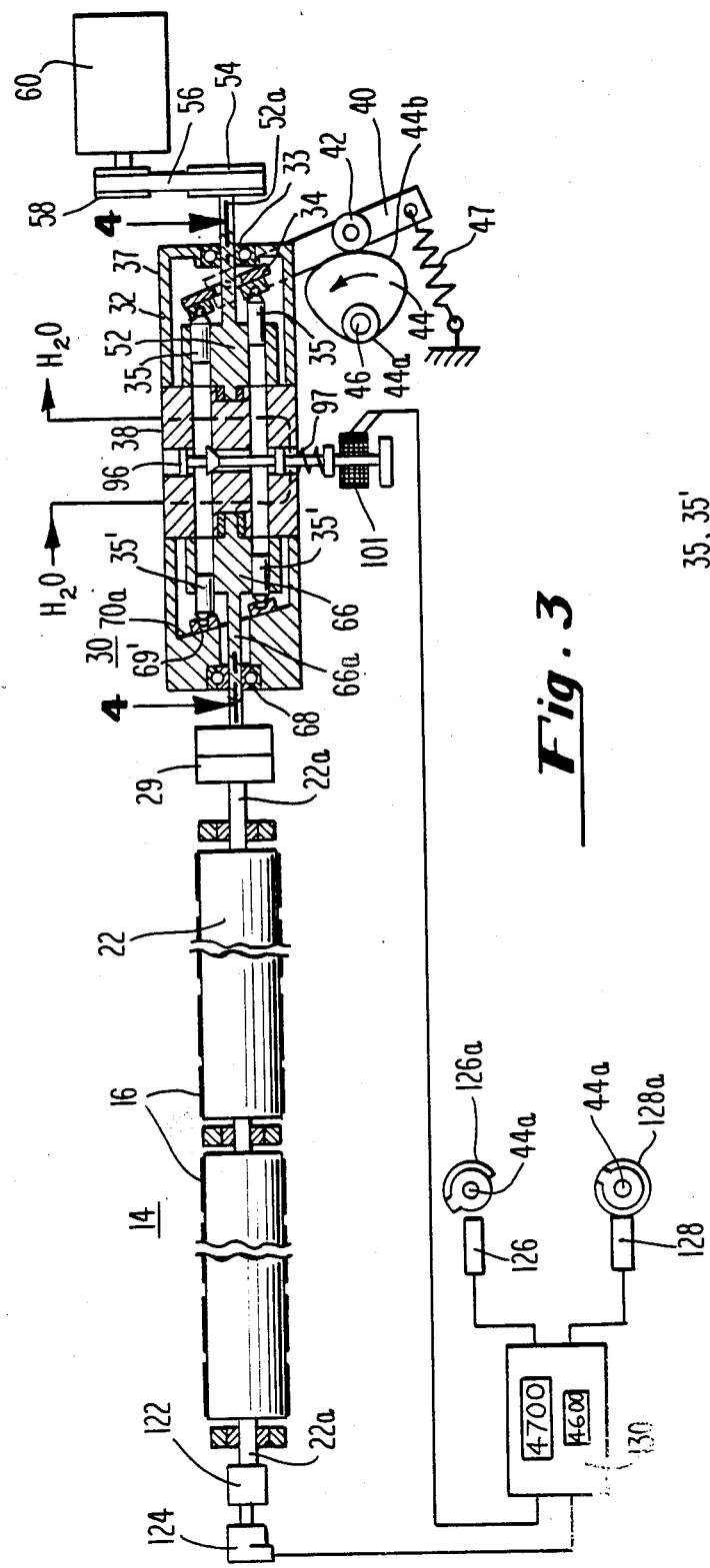
FIG. 3 is sectional view along the lines 3—3 in FIG. 1.
Figure 4:
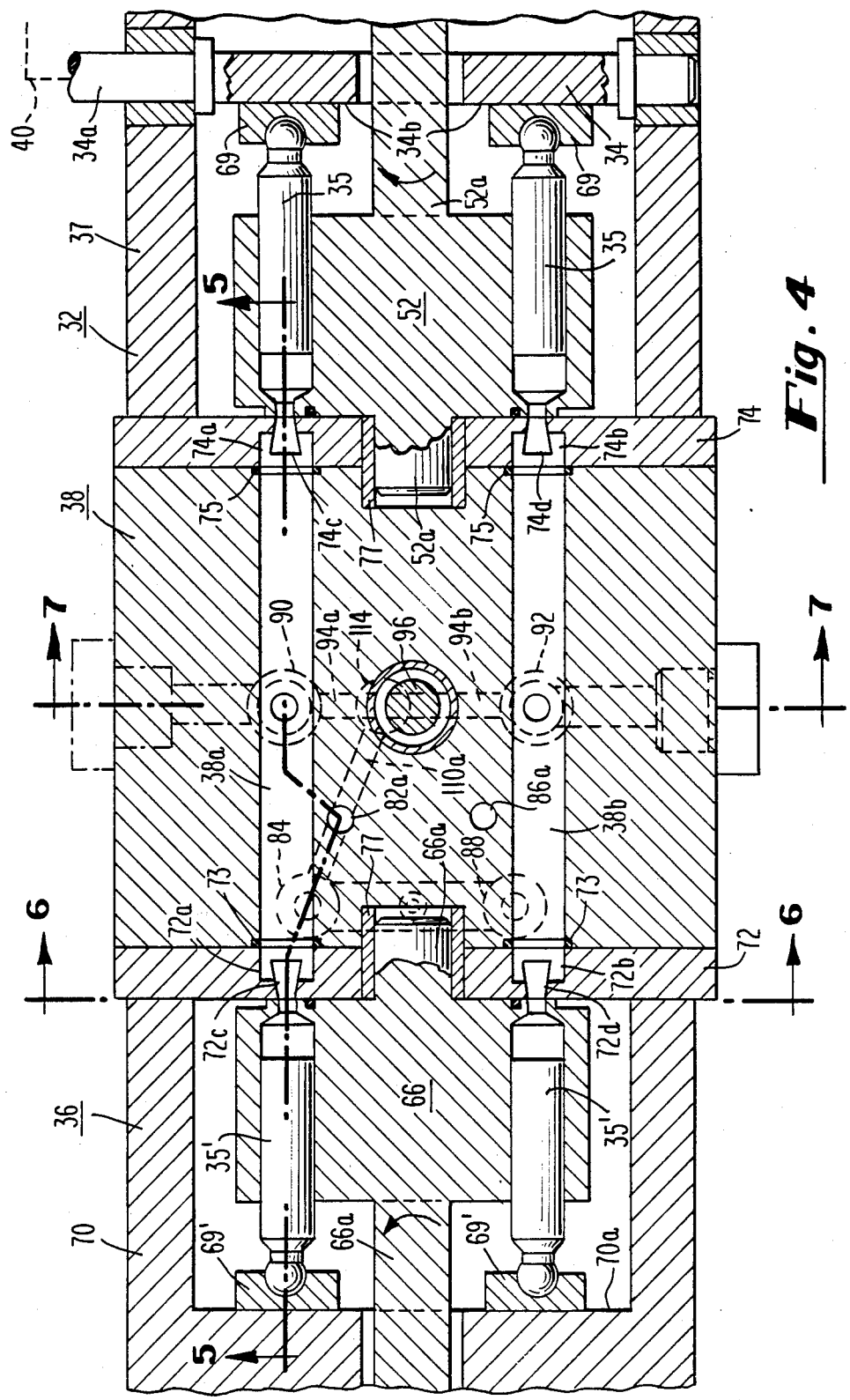
FIG. 4 is a horizontal sectional view taken along the lines 4—4 in FIG. 3.

The hydraulic index drive system 30 cyclically moves the belts 16 of conveyor 14 across the upper horizontal surface of the vacuum table 12 from left to right in FIGS. 1 and 2 to position a bag delivered from the bag machine 50 in the exact position for an accurate first fold in a bag folder, such as shown in Ser. No. 099,277, in the manner hereinafter to be described. The hydraulic index drive system 30, as shown in FIG. 3, comprises a variable displacement hydraulic pump 32 having a pivoted swash plate 34, a fixed displacement hydraulic motor 36 and an adaptor 38 positioned between the motor and the pump coupling the pump to the hydraulic motor to feed hydraulic fluid to and return hydraulic fluid from the hydraulic motor. As shown in FIG. 4, the swash plate 34 is carried by a shaft 34a having its ends journaled in the opposite sides of the housing 37 of the pump 32. A lever 40, FIGS. 3 and 4, is mechanically connected to the shaft 34a for controlling the angular position of the swash plate 34 to determine the pump displacement of the pistons 35. The lever 40, FIG. 3, is provided with a cam follower 42 which engages a cam 44 mounted on a shaft 46 which makes one revolution per cycle of the bag machine 50. The cam follower 42 is held against the cam 44 by a tension spring 47 having one end connected to the lever 40 and the other end fixed. The shaft 46 is driven through a timing drive 48, FIG. 1, which is connected to the drive for the bag machine seal bar 51. The cam 44, FIG. 3, is shaped to include a dwell portion 44a and an index portion 44b. When the cam follower 42 engages the dwell portion 44a, the swash plate 34 will be in a vertical position and thus there is no displacement of the pistons 35. The dwell portion 44a of the cam 44 corresponds to about 40% of the cycle and there is no pump output during the dwell portion of the cycle as later described in connection with FIG. 9. When the cam follower 42 engages the index portion 44b, the swash plate 34 is no longer vertical as shown in FIG. 3 and there is displacement of the pistons 35. The index portion 44b of the cam 44 corresponds to about 60% of the cycle so that the output of the pump rises to a set maximum and returns to zero output during the index portion of the cycle as later described in connection with FIG. 9. With this operation, the pressure supplied to the hydraulic motor 36 from the pump 32 brings the conveyor 14 up to maximum speed and the pressure returned from the motor decelerates the speed of the conveyor 14 to zero during the dwell portion of the cycle as later described in connection with FIG. 9. The hydraulic pump 32 is provided with a rotor 52 and rotor shaft 52a having a pulley 54 fixed thereto over which passes a belt 56 driven from a pulley 58 on a variable speed motor 60.

The hydraulic pump 32 is driven by the variable speed motor 60 which follows the speed of the bag machine 50.

Figure 8:
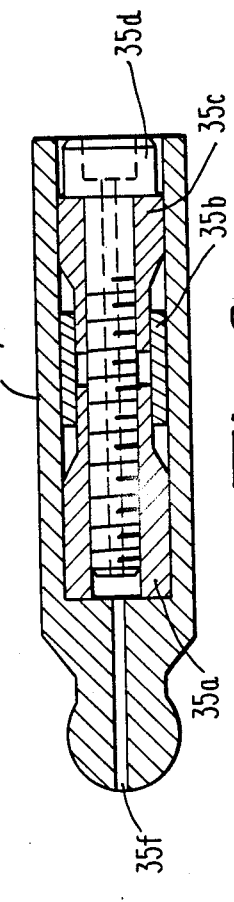
FIG. 8 is an enlarged view in cross section of one of the pump and motor pistons.

The hydraulic pump 32 utilized in the present hydraulic index drive system is commercially available from Sperry-Vickers, Model No. PVB-10-R-D-Y-30-M. The hydraulic motor 36 is also commercially available from Sperry-Vickers Model No. MFB-10-U-Y-31. Both the hydraulic pump and the hydraulic motor have a displacement of 1.29 cubic inches per revolution. The pump 32 and the motor 36 are each provided with nine pistons, 35 and 35' respectively. Each of the pistons 35 and 35' is the same. The pistons available on the Vickers units are hollow and in order to reduce the volume of fluid in the system for quick response in speed the pistons 35 and 35' are provided with a cavity fill assembly as shown in FIG. 8. The assembly comprises an internally threaded aluminum nut 35a, an expansion sleeve 35b and a clamp 35c. Both the nut and the clamp have reduced ends which extend into the expansion sleeve 35b. A cap screw 35d is inserted through the clamp 35c and is threaded into the nut 35a causing the sleeve 35b to expand and clamp the assembly within the cavity of the piston 35 and 35'. A flow passage 35f extends axially through the piston 35, 35' and through the cap screw 35d, FIG. 8. As pointed out above both the pump 32 and the motor 36 are provided with identical pistons 35, 35'.

As shown in FIGS. 3 and 4 the pistons 35 of the hydraulic pump 32 are positioned within cylinders within the pump rotor 52 carried by shaft 52a. One end of the shaft 52a is journaled in the adaptor 38 and the other end of the shaft 52a is supported in a bearing 33 in the pump housing 37. The ends of the pistons 35 are provided with bearing members 69 which are adapted to engage the adjacent bearing surface 34b of swash plate 34. The pistons 35 of the pump 32 rotate with the rotor 52 and the displacement of the pistons 35 within their respective chambers is controlled by the angular position of the swash plate 34 relative to its vertical position. In the hydraulic motor 36, its pistons 35' are adapted to reciprocate within chambers in the rotor 66 of motor 36 which is integral with the motor shaft 66a one end of which is journaled in the adaptor 38 and the other end of the shaft 66a is supported within a bearing 68 carried by the motor housing 70. As may be seen in FIGS. 3 and 5 the ends of the pistons 35' are provided with bearing members 69' which are adapted to engage the inclined bearing surface 70a within the motor housing 70. When hydraulic fluid, for example oil, is pumped through the adaptor 38 from the pump 32 to the motor 36 this causes the pistons 35' of the motor to reciprocate within their respective chambers and causes the motor rotor 66 on shaft 66a to rotate. The output end of motor shaft 66a is connected to one side of the flexible coupling 29 and the other side of the flexible coupling 29 is connected to the shaft 22a of the drive roll 22 of conveyor 14. Thus when the motor shaft 66a rotates this in turn rotates the drive roll 22 of conveyor 14.

Figure 5:
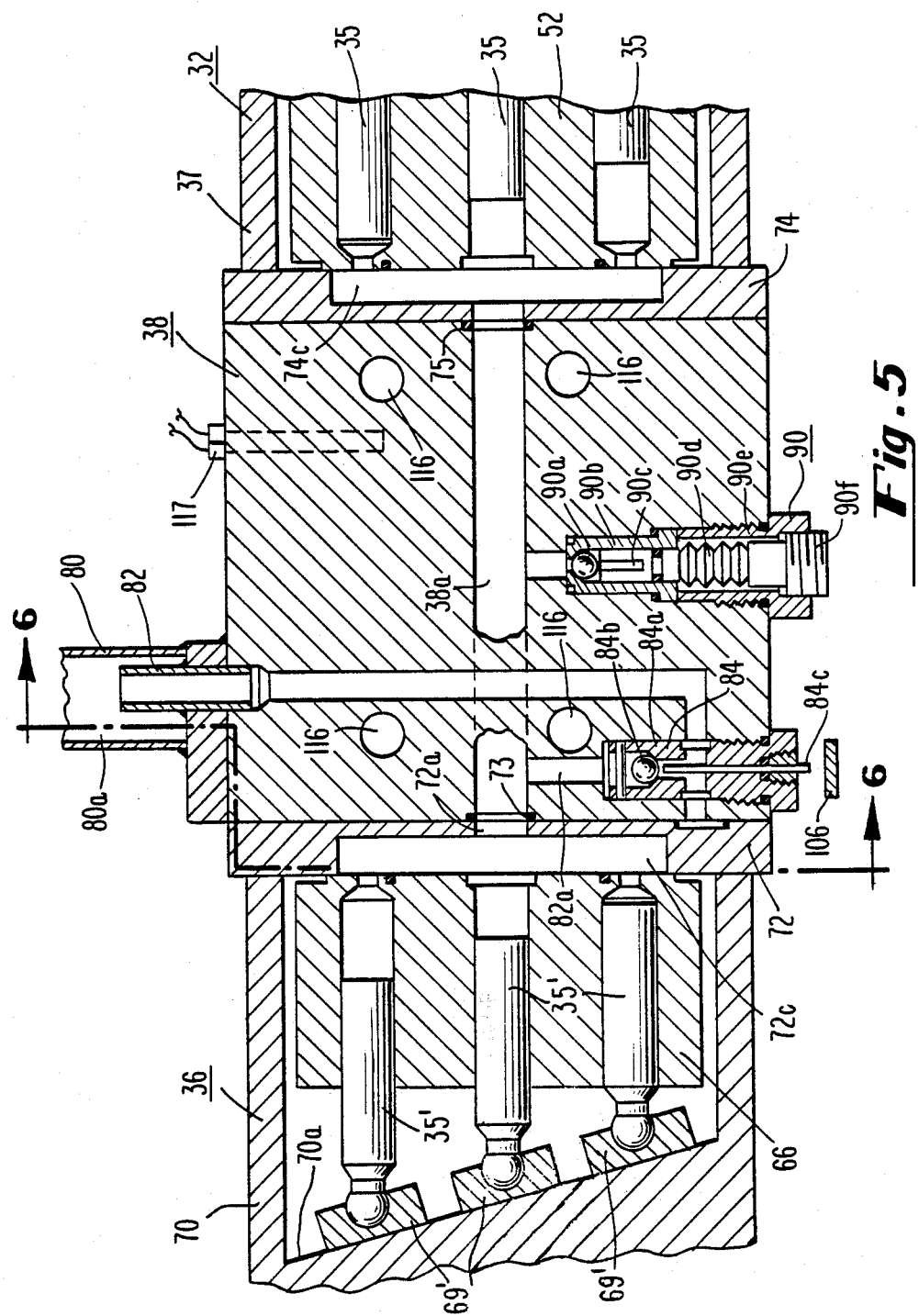
FIG. 5 is a vertical sectional view taken along the line 5—5 in FIG. 4 and 5—5 in FIG. 6.
Figure 6:
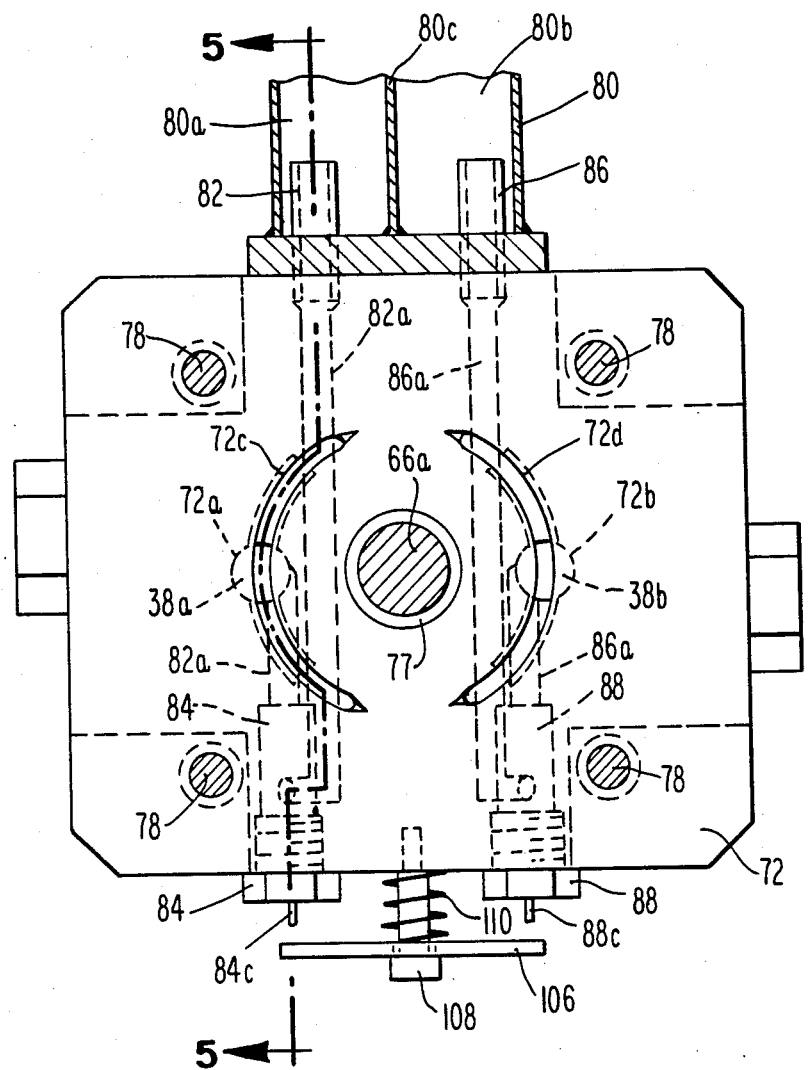
FIG. 6 is a sectional view taken along the lines 6—6 in FIGS. 4 and 5.

Referring to FIGS. 4 and 5 it will be seen that the hydraulic pump 32 and the hydraulic motor 36 are connected to the opposite ends of the adaptor 38. A transition plate 72 separates the motor 36 from the adaptor 38 and a transition plate 74 separates the pump 32 from the adaptor 38. The adaptor 38 is provided with a pair of flow passages 38a and 38b which interconnect the pump 32 with the motor through the transition plates 74 and 72. As shown in FIG. 4 the passages 38a and 38b of the adaptor 38 communicate respectively with counter bores 72a and 72b in the motor transition plate 72. The counter bore 72a communicates with a groove 72c in plate 72 and the counter bore 72b communicates with a groove 72d in the plate 72. As shown in FIG. 6 the grooves 72c and 72d are semicircular and communicate with the chambers in the motor rotor 66 which receive the motor pistons 35' as shown in FIGS. 4 and 5. The passages 38a and 38b are sealed with respect to the plate 72 by O-rings 73. The transition plate 74 connecting the pump 32 to the adaptor 38 is similar to transition plate 72. As shown in FIG. 4 the passages 38a and 38b are connected to counter bores 74a and 74b in the plate 74 and the counter bores 74a and 74b are respectively connected with semicircular grooves 74c and 74d. The passages 38a and 38b are sealed with respect to the plate 74 by O rings 75. The grooves 74c and 74d in the plate 74 communicate with the chambers in the pump rotor 52 which receive the pump pistons 35. As shown in FIG. 4 both of the plates 72 and 74 are provided with bearings 77 at their center for respectively supporting one of the ends of the motor shaft 66a and the pump shaft 52a.

Figure 7:
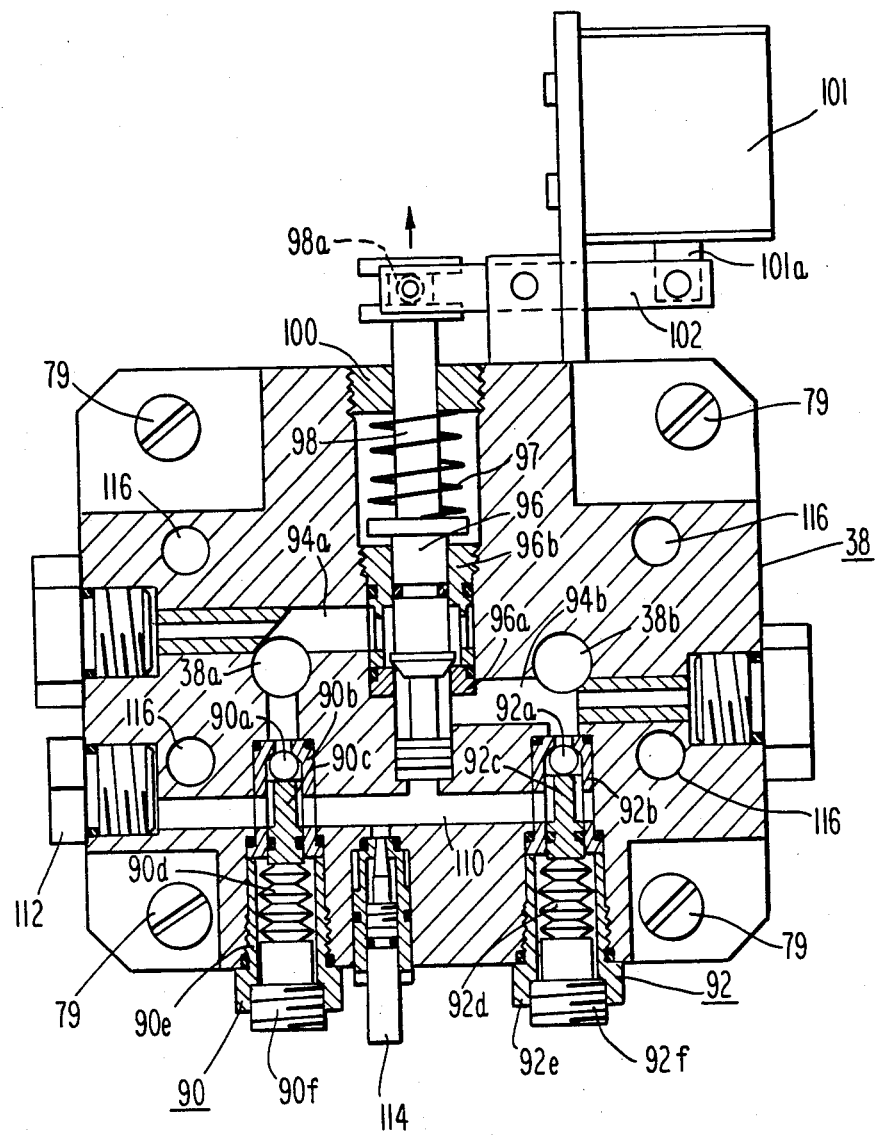
FIG. 7 is a sectional view taken along the lines 7—7 in FIG. 4.

The transition plate 72 and the motor 36 are secured to the adaptor 38 by a plurality of bolts 78, FIG. 6 and the transition plate 74 and the pump 32 are secured to the adaptor 38 by a plurality of bolts 79, FIG. 7.

Mounted on top of the adaptor 38 is a reservoir 80 for the hydraulic fluid. The hydraulic fluid, i.e. oil, is adapted to fill the various flow passages in the hydraulic index drive system 30 including the piston chambers in the pump 32 and motor 36 and the flow passages 38a and 38b which interconnect these chambers as well as other flow passages hereinafter described. For purpose of explanation the flow passage 38a will be referred to as a pressure flow passage and flow passage 38b will be referred to as a return passage. The reservoir 80 is divided into two sections 80a and 80b which are separated from each other by a central vertical partition 80c. Reservoir section 80a is provided with an entrance tube 82 which connects with a vertical flow passage 82a extending down through the body of the adaptor 38, FIGS. 5 and 6. The flow passage 82a connects at the opposite end with the flow passage 38a. Intermediate the ends of the flow passage 82a is a check valve 84 including a body 84a having a valve seat on which rests a ball 84b. The check va 84 also includes a check valve release pin 84c for engaging the ball 84b, the purpose of which will hereinafter be described. When the ball 84b of check valve 84 is in the position shown in FIG. 5 the passage 82a from the reservoir 80 is closed with respect to flow passage 38a, FIG. 5. As shown in FIG. 6 the other section 80b of reservoir 80 is provided with a tube 86 which is similar to tube 82 in section 80a. The tube 86 is connected with a vertical flow passage 86a having a check valve 88 therein similar to check valve 84. The lower end of the passage 86a connects with the flow passage 38b as shown in FIG. 6. When the ball check, not shown, of valve 88 is in the closed position the passage 86a from the reservoir 80 is closed with respect to flow passage 38b. The valve 88 also includes a ball release pin 88c as shown in FIG. 6. The purpose of dividing the reservoir 80 into two sections is to prevent air being removed from the working system during purging from not being drawn into the other section by the make up oil from the reservoir.

Referring to FIG. 7 it will be seen that a spring loaded check valve 90 connects with flow passage 38a and a spring loaded check valve 92 connects with flow passage 38b. The check valve 90 includes a ball 90a held against the seat in the check valve housing 90b by a spring loaded plunger 90c. A series of Bellvelle washers 90d are positioned within a spring washer housing 90e and held against the lower end of plunger 90c by a threaded plug 90f. The plug 90f may be adjusted to adjust the compression on the stack of spring washers 90d. Similarly, the check valve 92 includes a ball 92a held against the seat in the check valve housing 92b by a spring loaded plunger 92c. A series of Bellvelle washers 92d are positioned within a spring washer housing 92e and held against the lower end of plunger 92c by a threaded plug 92f. The plug 92f may be adjusted to adjust the compensation on the stack of spring washers 92d.

Further referring to FIG. 7, it will be seen that within the interior of adaptor 38 there is a flow passage comprising sections 94a and 94b which interconnect the flow passages 38a and 38b. The flow passage sections 94a and 94b are separated by a pressure relief valve 96 which cooperates with a valve seat 96a. The valve 96 reciprocates within a valve sleeve 96b. The valve 96 is normally biased in closed position by means of a compression spring 97 mounted on a spring guide 98 and positioned between a washer 99 and a threaded retainer 100. The retainer 100 is adjustable to provide for pressure adjustment on the spring 97. As may be seen in FIG. 7 the valve 96 is adapted to be actuated either by pressure applied to the bottom of the valve or by a solenoid 101 through the linkage 102 having one end connected to the solenoid plunger 101a and the other end connected to the upper end of the spring guide 98 at 98a. The purpose of the solenoid operation will hereinafter be described.

When the hydraulic index system 30, FIG. 3 is turned on the system is initially filled with hydraulic oil. The flow of oil is from the pump 32 through the pressure flow passage 38a to the motor 36 and back from the motor through the return passage 38b to the pump 32. Air may be quickly purged from the system when the system is initially filled with hydraulic oil by circulating flows of both pump and motor through the storage reservoir 80. This is accomplished by opening both of the check valves 84 and 88, FIGS. 5 and 6. As previously described each of the valves 84 and 88 is provided with a ball release pin 84c, 88c and as shown in FIG. 6 when the release pin 84c is moved upwardly it will engage the ball 84b and lift it off of its seat 84a thus opening the flow passage 82a for flow from the pressure flow passage 38a to the reservoir 80. Similarly, when the ball release pin 88c is moved upwardly, FIG. 6, this opens the valve 88 in the flow passage 86a so that the return flow passage 38b is connected via flow passage 86a to the reservoir 80. As shown in FIG. 5 the ball release pins 84c and 88c are adapted for operation by a valve pin retainer bar 106, FIG. 6, which is mounted on a cap screw 108 secured to the bottom of the adaptor 38. A spring 110 maintains the bar 106 in spaced relation to the adaptor. By pushing upwardly on the bar 106, FIG. 6, the pins 84c and 88c are moved upwardly thereby lifting the respective balls from the valves 84 and 88 off of their seats and opening the flow passages 38a and 38b with respect to the reservoir 80. This allows the pump output to go down the passage 82a through the valve 84 and up the passage 82 to the reservoir. If there are any bubbles in the oil they will go to the surface of the oil in the reservoir 80. Also this permits bringing back to the system from the reservoir 80 through the tube 86 and the flow passage 86a through the valve 88 to the flow passage 38b, oil that has essentially no air or bubbles. Thus by raising the actuator bar 106 and the ball release pins 84c and 88c the hydraulic index system can be quickly purged of air when the system is initially filled with hydraulic oil by circulating flows of both the pump 32 and the motor 36 through the storage reservoir 80.

Assuming that the hydraulic index system 30 has been purged of air it is no ready for operation. The following description of the operation of the system 30 will be with respect to one cycle of the system. As pointed out above in connection with FIG. 3, the cam 44 is mounted on the shaft 46 which makes one revolution per cycle of the bag machine 50. The cam follower 42 on lever 40 is held against the cam 44 by the tension spring 47. The cam 44 is shaped to include a dwell portion 44a and an index portion 44b. These portions of the cam correspond to the index and dwell portions of each cycle. This is best seen by reference to FIG. 9 of the drawing. As may be seen at the top of FIG. 9, there is a graph of the hydraulic pressure in the system during the index and dwell portions of each cycle. In this particular application, the system made 120 cycles per minute. The index portion of the cycle was adapted to index the conveyor for a distance of 36" to accommodate bags of a corresponding width. The index portion of the cycle consumed approximately 60% of the cycle i.e. 300 milliseconds and the dwell portion of the cycle consumed approximately 40% of the cycle, i.e. 200 milliseconds. At the start of the index portion of the cycle, the pressure in the system increased rapidly from zero up to approximately 3,000 lbs per square inch. This rather rapid rise is due to the shape of the cam 44 which causes the lever 40 to move out fairly quickly from its vertical position where the pressure is zero. The index portion 44a of the cam tapers down and is flat on top so it is maintaining the motor at maximum speed as seen from the second curve in FIG. 9 which shows the vacuum belt speed in feet per minute plotted against time in milliseconds. At that point in the cycle the system has passed the high pressure point and the system is essentially just overcoming the friction in the system and therefore the pressure curve goes rather flat at about 500 psi. That is the friction in the system that is necessary to overcome. The cam 46 then starts to cause the swash plate 34 to retract and as seen from the pressure curve in FIG. 9, the system starts slowing down the inertia load which is substantial in the system. In slowing down the inertia, the back pressure on the return side causes the motor to decelerate and brings the pressure down to zero and then it reverses and comes back to the zero point again at the end of the index portion of the cycle. At this time in the cycle, the swash plate 34 is in vertical position and there is no pressure applied in the system during the dwell portion of the cycle as shown in the curve at the top of FIG. 9. During the dwell portion of the cycle the vacuum belts are also at zero speed, i.e. stationery. During this cycle, the cam 44 has made one complete revolution. This cycle both as to hydraulic pressure and speed is repeated 120 times per minute.

The hydraulic index system 30 of the present invention is also provided with a safety arrangement for setting a maximim pressure in the system which bypasses the motor 36 and effectively disconnects the pump 32 from the motor during overload to protect both the index system and the load being driven from damage.

As shown in FIG. 7, the pressure relief valve 90 connects with the flow passage 38a which, as illustrated, is the pressure side from the pump. The pressure relief valve 92 connects with the flow passage 38b which is the return side from the motor 36. The valve 90 is set for the maximum pressure desired in the system, i.e. pressure flow passage 38a. This is accomplished by the adjustment of the screw 90f with respect to the spring washers 90d. For purposes of explanation, it will be assumed that the maximum pressure for the setting is about 3,000 lbs. per square inch. When this maximum pressure is exceeded in the flow passage 38a, this causes the ball 90a to move down in FIG. 7 and compresses the springs 90d. The hydraulic oil will go around the ball 90a and into the horizontal passage 110 between the pressure relief valves 90 and 92. It will be noted in FIG. 7 that the flow passage 110 communicates with the lower end of the valve 96 which is normally biased by spring 97 into a closed position intermediate the sections 94a and 94b of the flow passage that interconnects the pressure flow passage 38a and return passage 38b. When the hydraulic oil at this maximum pressure enters the flow passage 110, it creates a force against the bottom of the valve 96 which is substantially greater than the force of the spring 97 which normally holds the valve 96 in closed position. Thus the pressure in flow passage 110 causes the valve 96 to open thereby connecting the pressure flow passage 38a with the return flow passage 38b via the flow passage sections 94a and 94b to the valve 96. This cuts off the flow of oil to the hydraulic motor 36 and returns it to the pump 32. This in turn causes the motor 36 to stop and therefore there is no drive through the coupling 29 to the conveyor roll 22, FIG. 3.

While the system has been described with the pressure side in flow passage 38a and the return side in 38b it will be noted that the system is applicable for reversing the pressure side and the return side. This allows the pump to be reversed and run in the reverse direction where the flow passage 38b will be the pressure side and the flow passage 38a will be the return side. With this reverse operation, the pressure relief valve 92 will function in the manner previously described in connection with the valve 90. It will be understood of course that under these reverse conditions the flow will then be from flow passage 38b through the opened valve 96 and through the flow passage 94a to the return flow passage 38a.

Again, assume that there has been an overload of pressure in the flow passage 38a and the ball 90a of valve 90 has been moved down to open the valve 90 with respect to the flow passage 110 and to thereby raise and open the valve 96. The flow passage 110 is now filled with oil. At the left hand end of the flow passage 110, there is a plug 112 which is hollowed out so that it contains an air pocket. This will provide enough pressure in passage 110 on the bottom of the valve 96 to hold it open for a sufficient time for the operator to shut down the machine. There is a needle valve 114 connecting with the flow passage 110 as shown in FIG. 7. The needle valve 114 permits the air to slowly leak by the needle valve and enter the flow passage 110a, FIG. 4, which connects with the flow passage 82a for return to the reservoir 80. After the system has been stopped for a short period of time, the oil in the flow passage 110 will leak past the needle valve 114 and into the connecting flow passage 110a for return to the reservoir 80 through the vertical flow passage 82a. The system is then ready for normal operation again. Another purpose of the needle valve 114 is to accommodate any leakage around the ball 90a in valve 90. If such leakage occurs, this would allow the pressure in flow passage 110 to build up and if the oil in flow passage 110 was not allowed to leak off at some slow rate, the pressure might reach a value high enough to accidentally actuate the pressure relief valve 96 thereby shutting down the system.

The hydraulic index drive system of the present invention utilizes a relatively small volume fluid reservoir. In a particular embodiment, the reservoir had a volume of approximately one gallon. Since this volume is insufficient for the required heat absorption, the system is provided with a water cooling arrangement. This is indicated diagramatically in FIG. 3. The interior of the adaptor 38 is provided with a plurality of flow passages 116, FIGS. 5 and 7, for directing the water through the adaptor 38 for cooling. The temperature of the adaptor 38 may be monitored by any suitable means such as the thermocouple 117 shown in FIG. 5 and the flow of cooling water adjusted accordingly.

In the operation of an hydraulic index drive system as described above, the index length is repetitive to approximately plus or minus 0.5% with the normal load variations on the vacuum table belts. The index distance accuracy may be improved by a factor of two (plus or minus 0.25% instead of plus or minus 0.5%) by utilizing a novel feedback system. This system is diagramatically illustrated in FIG. 3. The feedback system operates by using the valve 96 to bypass the hydraulic motor 36 during deceleration allowing the motor 36 and the belts 16 of conveyor 14 which it drives to coast further than normal to compensate for higher than normal drag. As shown in FIG. 3, the valve 96 is adapted to be operated by the solenoid 101. The opposite end of the conveyor shaft 22a is connected through a coupling 122 to an encoder 124. The encoder 124 produces 1200 pulses per revolution of the shaft 22a. Also shown in FIG. 3 are a pair of proximity switches 126 and 128 associated respectively with cams 116a and 128a. The cams 126a and 128a are mounted on shafts which make one revolution per cycle and are mechanically connected with shaft 44a of cam 44 which initiates the cycles of the machine. The bypass pulse is initiated by the proximity switch 126 at a fixed point in the cycle and terminated when the index has reached a set distance usually about 98% through the index. If the index is less than normal it takes a longer time to reach the stop position which results in a longer coast time to compensate. As shown in FIG. 3, the solenoid 120, the encoder 124 and the proximity switches 126 and 128 are electrically connected to a digital counter/controller 130. All of these items are available commercially. The length of every index is indicated by the LED display in the counter/-controller 130 such that the consistency of index is readily apparent.

Figure 9:
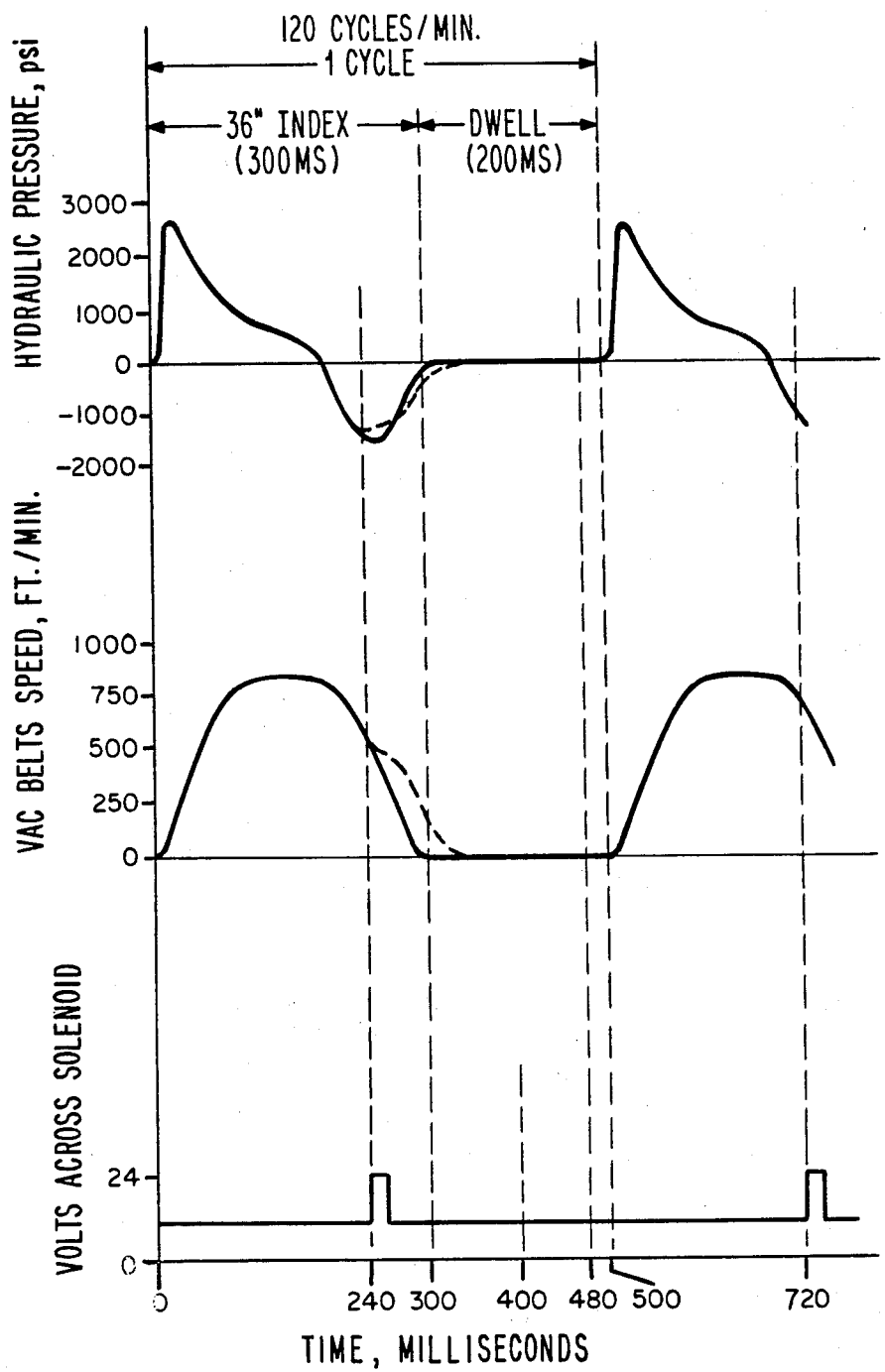
FIG. 9 shows a plurality of curves useful in describing the operation of the system.

In a particular embodiment of the feedback length control system the indexing took place for about 4 revolutions of the shaft 22a. This represents 4800 pulses since there are 1200 pulses per revolution from the encoder 124. Referring to FIG. 9 the effects of the length control system are illustrated in the upper two graphs by the dotted line portions near the end of the index portion of the cycle. The bottom graph in FIG. 9 is a graph of the volts across the solenoid 101 plotted against time in milliseconds. From the graph it will be noted that the solenoid switch 126 actuates at 240 milliseconds and starts the solenoid pulse. The counter 130 in FIG. 3 shows that the length of index is 4700. A thumb wheel switch, not shown, associated with the counter/controller 130 stops the solenoid pulse at a set distance count. As shown in FIG. 3, the set distance count has been selected as 4600 where the solenoid is turned off. This is also illustrated on the graph at the bottom of FIG. 9. The proximity switch 128 resets the distance counter in display at 400 milliseconds as shown in FIG. 9.

Although a preferred embodiment of the invention has been described and illustrated, it will be understood that other modifications may be made without departing from the spirit and scope of the invention as set forth in the appended claims.

What is claimed is:

1. An hydraulic index drive system for indexing a drive roll through a predetermined cycle having dwell and index portions comprising a variable displacement hydraulic pump having a swash plate, a fixed displacement hydraulic motor and an adaptor positioned between said motor and said pump coupling said pump to said hydraulic motor to feed hydraulic fluid to and return hydraulic fluid from said hydraulic motor, a lever on said pump for controlling the position for said swash plate to determine pump displacement, cam means operably connected to said lever for positioning said lever, means for rotating said cam means through one revolution per cycle, said cam means being shaped to include a dwell portion and an index portion, said dwell portion of said cam means corresponding to the dwell portion of the cycle so that there is no pump output during the dwell portion of the cycle and said index portion of said cam means corresponding to the index portion of the cycle so that the output of the pump rises to a set maximum during the index portion of the cycle, whereby the pressure supplied to the motor brings the motor up to maximum speed during the index portion of the cycle and the pressure returned from the motor decelerates the speed of the motor to zero during the dwell portion of the cycle.

2. An hydraulic index drive system according to claim 1 including cooling means connected with said adaptor for controlling the temperature of said adaptor.

3. An hydraulic index drive system according to claim 1 including a reservoir of hydraulic fluid connected with said adaptor for replacing any leakage of hydraulic fluid from said hydraulic pump and said hydraulic motor, and means in said adaptor to recycle the leakage back to said reservoir.

4. In an hydraulic index drive system according to claim 1 wherein said hydraulic motor drives the drive roll and conveyor means, the improvement of a feedback system for improving the index accuracy of the conveyor means comprising valve means in said adaptor for bypassing said hydraulic motor during deceleration for allowing the motor and the conveyor means to coast further than normal to compensate for higher than normal drag, and means for initiating a bypass pulse to operate said valve means at a fixed point in the cycle and for terminating said pulse when the index has reached a predetermined distance through the index, so that where the index is less than normal, the conveyor means takes a longer time to reach the stop position resulting in a longer coast time for compensation.

5. An hydraulic index drive system according to claim 1 including a reservoir for the hydraulic fluid and means connected with said adaptor for purging air from the system when said hydraulic index drive system is initially filled with hydraulic fluid by circulating hydraulic flows of both said pump and said motor through said reservoir.

6. An hydraulic index drive system according to claim 1 including pressure relief means connected with said adaptor for setting the maximum pressure in the hydraulic index drive system which bypasses said hydraulic motor and effectively disconnects said hydraulic pump from said motor during overload to protect said index system from damage.

7. An hydraulic index drive system according to claim 1 wherein said dwell portion of said cam means corresponds to about 40% of the cycle and said index portion of said cam means corresponds to about 60% of the cycle.

8. An hydraulic index drive system according to claim 1 wherein said hydraulic pump and said hydraulic motor are flow connected to said adaptor by a pair of transistion plates.

9. In a system for intermittently moving a web of material through a machine including conveyor means for receiving the web material and a drive roll for advancing the web material on the conveyor means during a predetermined cycle, each cycle including an index portion and a dwell portion, the improvement comprising an hydraulic index drive system connected to the drive roll, said hydraulic index drive system comprising a variable displacement hydraulic pump having a swash plate, a fixed displacement hydraulic motor and an adaptor positioned between said motor and said pump coupling said pump to said hydraulic motor to feed hydraulic fluid to and return hydraulic fluid from said hydraulic motor, a lever on said pump for controlling the position for said swash plate to determine pump displacement, cam means operably connected to said lever for positioning said lever, means for rotating said cam means through one revolution per cycle, said cam means being shaped to include a dwell portion and an index portion, said dwell portion of said cam means corresponding to less than 50% of the cycle so that there is no pump output during the dwell portion for the cycle and said index portion of said cam means corresponding to more than 50% of the cycle so that the output of the pump rises to a set maximum during the index portion of the cycle, whereby the pressure supplied to the motor brings the conveyor means up to maximum speed during the index portion and the pressure returned from the motor decelerates the speed of the conveyor means to zero during the dwell portion, and a variable speed motor for driving said hydraulic pump at the same speed as the delivery of the web material to the conveyor means.

10. An hydraulic index drive system according to claim 9 including cooling means connected with said adaptor for controlling the temperature of said adaptor.

11. An hydraulic index drive system according to claim 9 including a reservoir of hydraulic fluid connected with said adaptor for replacing any leakage of hydraulic fluid from said hydraulic pump and said hydraulic motor, and means in said adaptor to recycle the leakage back to said reservoir.

12. In an hydraulic index drive system according to claim 9, the improvement of a feedback system for improving the index accuracy of the conveyor means comprising valve means in said adaptor for bypassing said hydraulic motor during deceleration for allowing the motor and the conveyor means to coast further than normal to compensate for higher than normal drag, and means for initiating a bypass pulse to operate said valve means at a fixed point in the cycle and for terminating said pulse when the index has reached a predetermined distance through the index, so that where the index is less than normal, the conveyor means takes a longer time to reach the stop position resulting in a longer coast time for compensation.

13. An hydraulic index drive system according to claim 9 including a reservoir for the hydraulic fluid and means connected with said adaptor for purging air rom the system when said hydraulic index drive system is initially filled with hydraulic fluid by circulating hydraulic flows of both said pump and said motor through said reservoir.

14. An hydraulic index drive system according to claim 9 including pressure relief means connected with said adaptor for setting the maximum pressure in the hydraulic index drive system which bypasses said hydraulic motor and effectively disconnnects said hydraulic pump from said motor during overload to protect both said index system and the conveyor means being driven from damage.

15. An hydraulic index drive system according to claim 9 wherein said dwell portion of said cam means corresponds to about 40% of the cycle and said index portion of said cam means corresponds to about 60% of the cycle.

16. An hydraulic index drive system according to claim 9 wherein said hydraulic pump and said hydraulic motor are flow connected to said adaptor by a pair of transition plates.

* * * * *